Patented Oct. 6, 1936

2,056,442

UNITED STATES PATENT OFFICE 2,056,442

MOLDING POWDER

Emil H. Balz, Pittsburgh, Pa., assignor, by mesne assignments, to Plaskon Company, Incorporated, a corporation of Delaware No Drawing. Application February 23, 1934, Serial No. 712,611

4 Claims. (Cl. 106—22)

This invention relates to molding powders; and it comprises a molding powder containing cellulose regenerated from a viscose solution and impregnated with a dry solid reaction product of urea and formaldehyde, solidified in situ, said product being capable of resinifying under heat and pressure; all as more fully hereinafter set forth and as claimed.

Many methods have been proposed for preparing thermoplastic formaldehyde-urea compositions, seeking a material adaptable for hot pressing into sound, stable molded articles. It has been difficult to obtain compositions on a commercial scale, which will first flow in the mold under heat and pressure and then heat-harden and which, at molding temperatures, do not develop amounts of volatile bodies or other by-products such as will destroy the soundness or stability of the molded article.

In the copending application Serial No. 494,693, filed November 10, 1930 by A. M. Howald, a co-worker of the present applicant, advantageous methods of preparing formaldehyde-urea compositions, commercially satisfactory for hot pressing, are disclosed and claimed. My present invention is directed to an improvement in such methods by which new, improved molding compositions, capable of yielding upon hot pressing molded articles having increased transparency or translucency, as more fully described post.

In the said application Serial No. 494,693, the broad method disclosed comprises reacting urea with formaldehyde in aqueous solution in a correlated and limited molar ratio, acidity and temperature, to produce thinly mobile liquids capable of entering capillaries and free of gummy condensation, prior to any substantial resinification, by evaporating the water at relatively low temperatures, the drying temperature being sufficient to remove substantially all the water and volatiles, but being insufficient to resinify the formaldehyde-urea product. In that way, there are obtained dry, soluble, fusible, heat-hardening potential resins directly convertible into insoluble, infusible, stable resin continua by a subsequent hot pressing. These potential resins so obtained have the formaldehyde combined with the urea in substantially the same ratios desired in the final molded article, namely in molar ratios between 1.55: 1 and 1.05: 1 as described and claimed in Serial No. 494,693; the said ratios being employed from the very beginning of the process and no excess formaldehyde being present at any stage. In one specific method there described, the thinly mobile non-gummy liquid is taken up in fibrous, absorbent filler, such as sulphite pulp and the like, to form a moist impregnated fibrous mass which is then dried in a current of warm air to arrest the reaction and obtain the desired dry, fusible heat-hardening molding compositions containing said fibrous filler impregnated with said potential resin.

In the present invention the same things are done except that I employ regenerated cellulose in lieu of sulphite pulp for taking up the said thinly mobile solutions of the urea-formaldehyde reaction products, and obtain as a dry product regenerated cellulose impregnated with the said potential resins. The molar ratios of formaldehyde combined with urea are as before, this being more specifically described post. In this way several advantages also set forth post are obtained. In other words the fusible, heat-hardening urea-formaldehyde product is formed in situ in the regenerated cellulose and the resinification thereof, is postponed and subsequently effected during the hot pressing. During the hot pressing and resinification of the urea-formaldehyde products to the final insoluble, infusible state, I have found that regenerated cellulose combines with the resin better than the sulphite pulp or other ordinary cellulose materials. For one thing, the final products so obtained have a markedly increased translucence and even in some cases decided transparency. Just why the regenerated cellulose behaves differently is not known and as to this I am satisfied with noting the observed difference and utilizing it to advantage in the present improvement over the said prior processes and products.

Generally, I have found in practice that in such articles the fibers appear to disappear to a large extent; possibly because of a fluxing action and possibly for optical reasons. Both appear to contribute. It is found in practice that the better and more intimate the association of the binder and the filler can be made the greater is the homogeneity of the product; the better is the quality of the shaped hot molded article. It is better because it is freer of pores, and is therefore more resistant. It is also better for optical reasons. With a well-made article using sulfite paper pulp a high degree of translucency can be attained. This is particularly valuable with lamp shades and similar articles. In these molded articles the character of the filler is quite as important as that of the binder; the best results are obtained with a proper correlation of the two. Also, the way in which the association is effected is important.

The best results are attained when an aqueous solution of urea and formaldehyde in a thinly mobile condition is taken up by the filler after reaction has gone forward to a certain extent, but while the liquid is freely mobile; and the two are then dried down together. In so doing association is intimate; impregnation of filler with binder is intimate.

It is found in practice that good results are obtained by using sulfite pulp and a thinly mobile solution and drying the mixture in a feebly but positively acid condition. A liquid of 6 pH with a fiber of similar acidity gives a mixture drying quickly and completely. Other acidities can be used in drying but about 6 pH is regarded as most advantageous at this time. Later, when the dried material is hot molded and cured this acidity does not interfere with the free flow necessary in the flow period in molding. For curing, however, that is for setting to make a permanently infusible and insoluble product, a greater acidity is required. It has been found to be a useful expedient to incorporate with the binder a small proportion of an additional substance which is not normally acid but develops acidity during molding. Benzoyl peroxid is a useful material for this purpose.

Ordinary paper pulp, such as sulfite pulp, is substantially pure cellulose. By reaction with various chemicals, cellulose can be brought into solution and afterwards recovered from this solution. This is what is known as regenerated cellulose. One of the processes in common use for making regenerated cellulose articles is that known as the "viscose" process; treatment of pulp with caustic soda solution followed by a treatment with carbon bisulfid. The cellulose dissolves to a thick liquid known as viscose. From viscose threads (rayon) and sheets are commercially made; the viscose being extruded as a liquid and set by the action of various chemicals. Sheet regenerated cellulose is a commercial material. In making rayon thread in this way there is a large proportion of spoiled thread (spinning scrap, processing scrap, etc.) which is available at low prices. This rayon factory scrap is particularly suitable for the present purposes because of its physical form.

It is found that regenerated cellulose from the viscose process, which may be the commercial sheeted material or may be rayon scrap, is particularly suitable for making highly translucent molded articles with the aid of urea-formaldehyde binders; making hot cured molded articles. All other conditions being the same, a greater degree of translucency can be obtained with regenerated cellulose than with sulfite pulp; one of the best forms of paper pulp for this purpose. The article is also high grade in other respects, being poreless and resistant. While it is ordinarily supposed that the fibrous nature of paper pulp is necessary in securing quick and efficient drying, it has been found that rather coarse clipped rayon scrap gives substantially equally good drying results. It is not porous in the same sense as the pulp fiber but the binder solution seems to penetrate efficiently.

In what is now regarded as the best mode of applying the stated invention, urea is dissolved in commercial formaldehyde solution; using such a ratio as to have 4 parts by weight of commercial urea to 3 parts of actual formaldehyde, $COH_2$. These weights give a molecular ratio of formaldehyde to urea of 1.5:1; a ratio within the range which gives the most permanent final molded products. This range is between 1.05:1 and 1.55:1. Commercial formaldehyde solution is mostly acid and is apt to react rather violently with urea. To slow down the reaction, it is in general advisable to partially neutralize the formaldehyde solution prior to adding the urea. With neutral commercial forms of formaldehyde solution, it may be desirable to acidify somewhat. As stated, a feeble but positive acidity of the order of 6 pH gives a regulable and easily controlled reaction. On dissolving the urea in the formaldehyde, there is at first a physical chilling action and the mixture may be somewhat warmed to bring it to the ordinary temperature, and allowed to stand for a time. The above described method of preparing the thinly mobile solutions of urea-formaldehyde reaction products which are capable of entering capillaries and are free of gummy condensation products or resinous material, is substantially the same as that disclosed in the said Howald application Serial No. 494,693. In my present invention the liquid so obtained, while still thin and mobile enough to pass readily through filter paper, is added the regenerated cellulose. The regenerated cellulose may be used in the form of clippings made from sheet material; or as bodies of rejected threads from the rayon manufacture. In either event, the liquid and the cellulose are worked together sufficiently to get a uniform distribution of the liquid and the solid and produce an open-textured mass which can be readily dried. A concentrated liquid is desirable, as it enables the introduction of the proper amount of binder without making the mass too wet. Drying is found to be quick and complete using ordinary drying apparatus, but the temperature of the mass should not be allowed to rise above about 60° C. After the drying the material is disintegrated to make a molding powder. A solid reaction product of urea and formaldehyde is produced in situ in and on the regenerated cellulose, solidification being by the removal of water in the evaporation. As stated, in the said Serial No. 494,693, these dry solid urea-formaldehyde products are directly convertible into insoluble, infusible stable resin continua by a subsequent hot pressing, without liberating any substantial amount of volatiles. After or during the disintegration a little benzoyl peroxid may be admixed. Ordinary mold lubricants may also be added at this time.

The described preparation, on being molded at a temperature around 145° C. (mold walls) and a pressure of about a ton per square inch, quickly gives firm, translucent, glassy molded articles of unusually resistant character. A well made preparation is so poreless and resistant as to withstand as an accelerated test, the action of boiling water for half-an-hour. The molding powder may contain dyes where colored finished articles are required. The final molded article shows that the visible identity of the contained fiber has disappeared to a much greater extent than is the case with comparable preparations using ordinary commercial paper pulp. The translucency is better.

While as stated, commercial regenerated cellulose may be used as it comes, being clipped in convenient size, it is sometimes good practice to take the commercial regenerated cellulose or the scrap, as the case may be, and subject it to disintegration in a beater. This gives a more homogeneous product, and standardization is also made possible. If the material is treated in a beater it is afterwards dried and then mixed with a mobile solution of the urea-formaldehyde condensation product as previously described.

In the solution used, it is best to have the reaction in the solution go forward to a substantial extent, but not sufficiently to interfere with free mobility or produce a solid phase. The liquid should freely enter the capillary pores of the material. Usually a heavy solution weighing about 10 pounds to the gallon (1.2 specific gravity) and carrying about 50 per cent solid matter is used. Lighter solutions can be used but are not convenient in making a moist, open-textured mass, easily dried. Heavier and more viscous liquids do not enter the pores capillarily and intimate admixture with fiber is difficult. Using a 10 pound solution enough of the regenerated cellulose is used to make a moist mass. The two may be mixed in the proportion of 3 parts by weight of the solution and 1 part of dry regenerated cellulose. This will give a final molded article having a fiber-binder ratio of about 2:3.

As stated, a slight but positive acidity of the mass is desirable during drying; something like about 6 pH. A sample of the moist mass covered with water can be examined with the usual pH indicators.

Where an adjustment of acidity is necessary, this can be done by the addition of reagents to the mobile solution prior to incorporation of the regenerated cellulose. A solution of triethanolamine is convenient for partial neutralization of acidity. If the acidity is to be stepped up, this can be done by an addition of phthalic acid.

Articles made with the described urea-formaldehyde solution and well bleached sulfite pulp are white and translucent; the translucency being better than with other kinds of paper pulp. In thin layers, the amount of light transmitted is rather large; making the material particularly well adapted for lamp shades. But by substituting regenerated cellulose for the sulfite pulp, a much improved translucency is obtained; for equal thickness of layer, the amount of light transmitted is considerably greater. The improvement is substantial and well worth while. The increased translucency resulting from the use of regenerated cellulose may perhaps be due to a better homogenization or perhaps to a difference in index of refraction as between regenerated cellulose and ordinary cellulose. Both effects may contribute to the results.

What is claimed is:—

1. A molding powder containing a cellulosic filler consisting of regenerated cellulose impregnated with a dry, solid, fusible reaction product of urea and formaldehyde dried and solidified in situ and capable of flow and resinification under heat and pressure, said formaldehyde-urea product having formaldehyde combined with urea in molar proportions ranging between 1.05:1 and 1.55:1 and being resinifiable into insoluble, infusible, stable resinous masses without substantial alteration in said ratio and without liberation of volatiles.

2. The molding powder of claim 1 wherein the formaldehyde-urea reaction product contains formaldehyde and urea combined in about the molecular proportion 1.5:1.

3. The molding powder of claim 1 containing a small proportion of an additional substance which while not normally acid develops acidity during hot molding, said additional substance becoming effective at hot molding and being benzoyl peroxide.

4. The molding powder of claim 1 wherein the ratio of the regenerated cellulose to the said reaction product is about 2:3.

EMIL H. BALZ.